US011587404B2

(12) United States Patent
Tadepalli et al.

(10) Patent No.: US 11,587,404 B2
(45) Date of Patent: Feb. 21, 2023

(54) MULTI-EVENT MEDIA FEED INTEGRATION FOR UNIFIED VIDEO STREAMING FOR SPORTSBOOK APPLICATION

(71) Applicant: AT&T Intellectual Property I, L.P., Atlanta, GA (US)

(72) Inventors: Ashwin Tadepalli, Ballwin, MO (US); Keith Byer, St. Louis, MO (US); Sahand Sadri, Ellisville, MO (US); Vincent Biondo, Wildwood, MO (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 75 days.

(21) Appl. No.: 17/099,143

(22) Filed: Nov. 16, 2020

(65) Prior Publication Data

US 2022/0157127 A1 May 19, 2022

(51) Int. Cl.
*A63F 13/24* (2014.01)
*G07F 17/32* (2006.01)
*H04N 21/458* (2011.01)
*H04N 21/81* (2011.01)
*H04N 21/6408* (2011.01)
*H04N 21/482* (2011.01)

(52) U.S. Cl.
CPC ...... *G07F 17/3288* (2013.01); *G07F 17/3211* (2013.01); *H04N 21/458* (2013.01); *H04N 21/482* (2013.01); *H04N 21/6408* (2013.01); *H04N 21/8133* (2013.01)

(58) Field of Classification Search
CPC ..................................................... G06Q 50/34
See application file for complete search history.

(56) References Cited

U.S. PATENT DOCUMENTS

| 2017/0140611 | A1* | 5/2017 | Marantelli | G06Q 50/34 |
| 2017/0221308 | A1* | 8/2017 | Lakhotia | G07F 17/3246 |
| 2019/0362601 | A1* | 11/2019 | Kline | G07F 17/3223 |
| 2021/0027576 | A1* | 1/2021 | Nelson | G07F 17/3288 |

OTHER PUBLICATIONS

Shawn Egide,"Day At The Track, Inc. Launches the Most Advanced Online Wagering Solution* for Thoroughbred, Harness and Greyhound Racing" Day At The Track, Inc., Jun. 8, 2005, 3 pages.
OffTrackBetting.comReview, downloaded from https://www.racingbetting.com/reviews/offtrackbetting on Sep. 21, 2021, 11 pages.

* cited by examiner

*Primary Examiner* — Lawrence S Galka

(57) ABSTRACT

Apparatuses, computer-readable media, and methods for obtaining and presenting a user wager in addition to an integrated media stream comprising media feeds of a selection of sporting events that are available for wagering via a sportsbook application are described. For instance, a processing system including at least one processor may obtain a first user wager associated with a first sporting event via at least one interface screen of the sportsbook wagering application, present, via the at least one interface screen, an integrated media stream comprising media feeds of a selection of sporting events from among a plurality of sporting events, where each of the selection of sporting events is associated with a respective media feed and is also available for at least one type of wagering via the sportsbook wagering application, where the selection of sporting events includes the first sporting event, and present, via the at least one interface screen, the first user wager in addition to the integrated media stream.

20 Claims, 5 Drawing Sheets

MULTI-EVENT MEDIA FEED INTEGRATION FOR UNIFIED VIDEO STREAMING FOR SPORTSBOOK APPLICATION

The present disclosure relates generally to telecommunication network delivery of multiple media feeds for split-screen viewing experiences, and more particularly to apparatuses, non-transitory computer-readable media, and methods for obtaining and presenting a user wager in addition to an integrated media stream comprising media feeds of a selection of sporting events that are available for wagering via a sportsbook application.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
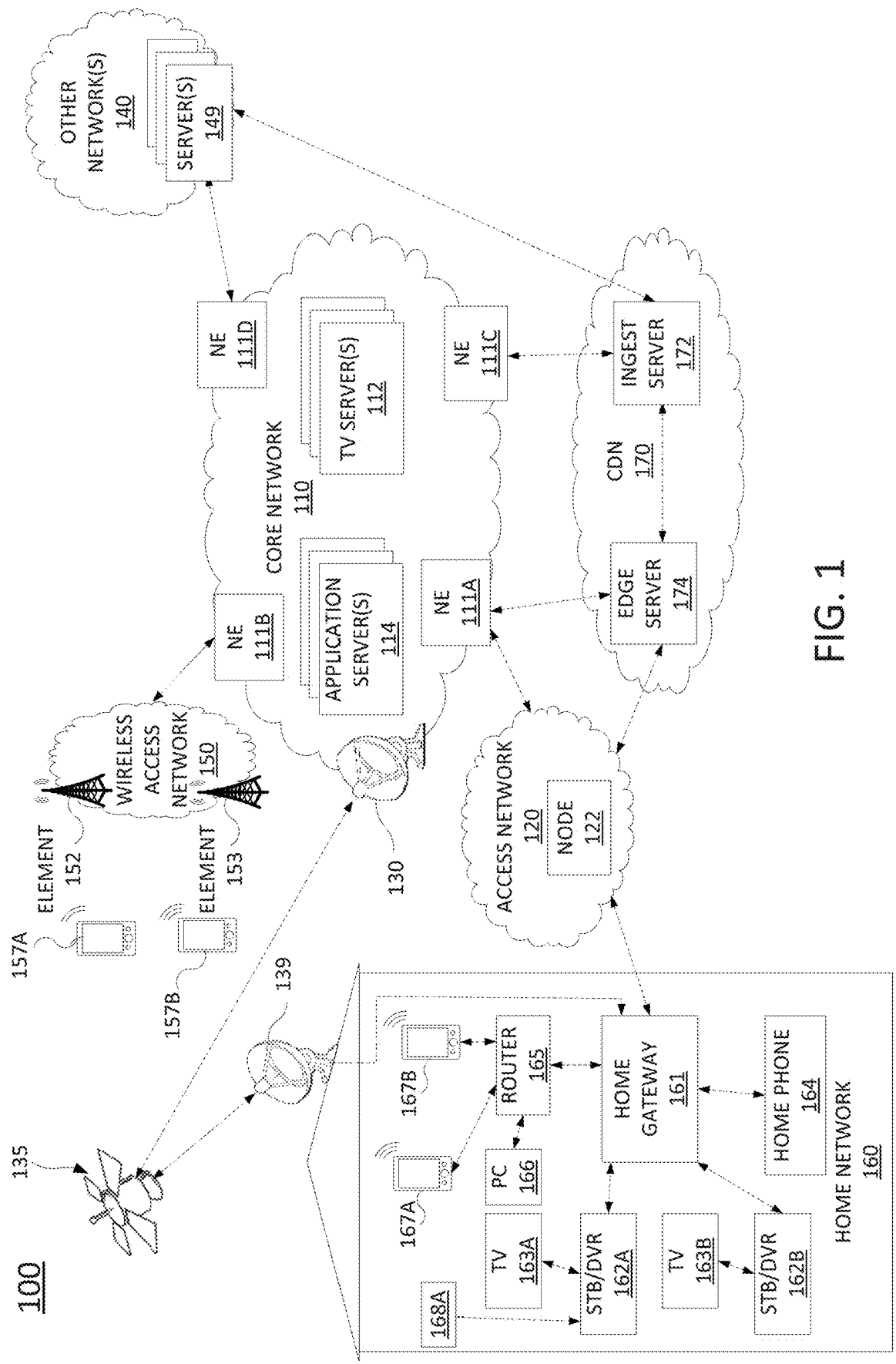
FIG. 1 illustrates an example network related to the present disclosure.

In one example, the present disclosure describes an apparatus, computer-readable medium, and method for obtaining and presenting a user wager in addition to an integrated media stream comprising media feeds of a selection of sporting events that are available for wagering via a sportsbook application. For instance, a processing system including at least one processor may perform operations to provide a sportsbook wagering application in which the operations include obtaining a first user wager associated with a first sporting event via at least one interface screen of the sportsbook wagering application, presenting, via the at least one interface screen, an integrated media stream comprising media feeds of a selection of sporting events from among a plurality of sporting events, where each of the selection of sporting events is associated with a respective media feed and is also available for at least one type of wagering via the sportsbook wagering application, where the selection of sporting events includes the first sporting event, and presenting, via the at least one interface screen, the first user wager in addition to the integrated media stream.

The approximate size of the sports wagering industry is 150 billion dollars according to the American Gambling Association. It is also estimated that more than 60 million unique individuals have participated in fantasy sports according to the Fantasy Sports & Gaming Association. In addition, 42 states have legalized or are in the processing of legalizing sports betting. Examples of the present disclosure provide an over-the-top integrated sports betting and viewing experience (e.g., via a sportsbook wagering application) in which a subscriber can view whichever sporting events the subscriber has wagered on. This unique experience combines the live viewing of sports broadcasts alongside the live betting lines associated with the sporting events. In one example, the sportsbook wagering application may be accessed as a television channel in which multiple sporting events that a user has wagered on are displayed in a shared/split screen. However, a user may be provided an option to have the display be focused on a single sporting event if desired.

In one example, a sportsbook wagering application of the present disclosure may be provided by a telecommunication network service provider, or a multichannel video programming distributor (MVPD) (broadly, a video service provider). In one example, the sportsbook wagering application may include an integrated sportsbook. In another example, the sportsbook wagering application may interface with one or more independent sportsbook systems of one or more sportsbooks. For instance, a sportsbook may provide a number of sporting events that are available for at least one type of wagering. The sportsbook may also provide offers of odds and stakes for various available types of wagers for the various sporting events. In one example, the sportsbook may employ oddsmakers to set various odds for various available types of wagers for the various sporting events. In another example, the sportsbook may obtain odds for various available types of wagers for the various sporting events from one or more independent oddsmakers. In one example, the sportsbook wagering application may provide wagering options from multiple different sportsbooks, or sportsbook systems for a single user. Thus, a user may wager with one or multiple sportsbooks via a single sportsbook wagering application of the present disclosure.

In one example, the sportsbook wagering application may be included as an additional service that is available to subscribers of the video service provider. In one example, the sportsbook wagering application may comprise an opt-in service that provides an opportunity to existing sports wagering users to have an integrated sports wagering experience via their video programming subscription. For example, currently users may have access to applications provided by sportsbook operators to place wagers of various sporting events. However, in order to watch a sporting event that is wagered on, a user typically would have to separately find the sporting event on television and tune to the appropriate channel. Examples of the present disclosure provide a "one stop shop" for such users who already desire to wager on sporting events and who would tune to watch such events in any case. In addition, examples of the present disclosure may include an option to present an interface in a language of a user's choice.

As noted above, the sportsbook wagering application may provide media feeds from multiple sporting events that a user has wagered on to be displayed in a shared/split screen. In one example, the sportsbook wagering application may provide an integrated media stream comprising media feeds of a selection of sporting events (e.g., the sporting events the user has wagered, sporting events the user is interested in wagering on, and/or sporting events that are recommended for the user by the sportsbook wagering application). For instance, in one example, the integrated media stream may be a unicast media stream comprising a package of the respective media feeds of the selection of sporting events. As such, the combinations of live media feeds of sporting events are personalized for each user. In one example, the present disclosure packages live media feeds into an integrated media stream for a user via a content distribution network (CDN). These and other aspects of the present disclosure are described in greater detail below in connection with the examples of FIGS. 1-5.

To better understand the present disclosure, FIG. 1 illustrates an example network 100, at least a portion of which may provide a processing system for obtaining and presenting a user wager in addition to an integrated media stream comprising media feeds of a selection of sporting events that are available for wagering via a sportsbook application (e.g., a sportsbook wagering application), in accordance with the present disclosure. As shown in FIG. 1, the network 100 connects mobile devices 157A, 157B, 167A and 167B, and home network devices such as home gateway 161, set-top boxes (STBs) 162A and 162B, television (TV) 163A and TV 163B, home phone 164, router 165, personal computer (PC) 166, and so forth, with one another and with various other devices via a core network 110, a wireless access network 150 (e.g., a cellular network), an access network 120, other networks 140, content distribution network (CDN) 170, and/or the Internet in general. For instance, connections between core network 110, access network 120, home network 160, CDN 170, wireless access network 150 and other networks 140 may comprise the Internet in general, internal links under the control of single telecommunication service provider network, links between peer networks, and so forth.

In one example, wireless access network 150 may comprise a radio access network implementing such technologies as: Global System for Mobile Communication (GSM), e.g., a Base Station Subsystem (BSS), or IS-95, a Universal Mobile Telecommunications System (UMTS) network employing Wideband Code Division Multiple Access (WCDMA), or a CDMA3000 network, among others. In other words, wireless access network 150 may comprise an access network in accordance with any "second generation" (2G), "third generation" (3G), "fourth generation" (4G), Long Term Evolution (LTE), "fifth generation" (5G) or any other yet to be developed future wireless/cellular network technology. While the present disclosure is not limited to any particular type of wireless access network, in the illustrative example, wireless access network 150 is shown as a UMTS terrestrial radio access network (UTRAN) subsystem. Thus, elements 152 and 153 may each comprise a Node B, an evolved Node B (eNodeB), a gNodeB (gNB), 5G base station, or new radio (NR), and so forth (broadly a "base station"). In one example, wireless access network 150 may be controlled and/or operated by the same entity as core network 110.

In one example, each of the mobile devices 157A, 157B, 167A, and 167B may comprise any subscriber/customer endpoint device configured for wireless communication such as a laptop computer, a Wi-Fi device, a Personal Digital Assistant (PDA), a mobile phone, a smartphone, an email device, a computing tablet, a messaging device, and the like. In one example, any one or more of the mobile devices 157A, 157B, 167A, and 167B may have both cellular and non-cellular access capabilities and may further have wired communication and networking capabilities. In accordance with the present disclosure, each of the mobile devices 157A, 157B, 167A, and 167B may comprise a client component for a sportsbook wagering application (broadly a sportsbook wagering "client application").

As illustrated in FIG. 1, network 100 includes a core network 110. In one example, core network 110 may combine core network components of a cellular network with components of a triple play service network; where triple play services include telephone services, Internet services and television services to subscribers. For example, core network 110 may functionally comprise a fixed mobile convergence (FMC) network, e.g., an IP Multimedia Subsystem (IMS) network. In addition, core network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 110 may also further comprise a broadcast television network, e.g., a traditional cable provider network or an Internet Protocol Television (IPTV) network, as well as an Internet Service Provider (ISP) network. The network elements 111A-111D may serve as gateway servers or edge routers to interconnect the core network 110 with other networks 140, wireless access network 150, access network 120, and so forth. As shown in FIG. 1, core network 110 may also include a plurality of television (TV) servers 112, and a plurality of application servers 114. For ease of illustration, various additional elements of core network 110 are omitted from FIG. 1.

With respect to television service provider functions, core network 110 may include one or more television servers 112 for the delivery of television content, e.g., a broadcast server, a cable head-end, and so forth. For example, core network 110 may comprise a video super hub office, a video hub office and/or a service office/central office. In this regard, television servers 112 may include content server(s) to store scheduled television broadcast content for a number of television channels, video-on-demand (VoD) programming, local programming content, and so forth. Alternatively, or in addition, content providers may stream various contents to the core network 110 for distribution to various subscribers, e.g., for live content, such as news programming, sporting events, and the like. Television servers 112 may also include advertising server(s) to store a number of advertisements that can be selected for presentation to viewers, e.g., in the home network 160 and at other downstream viewing locations. For example, advertisers may upload various advertising content to the core network 110 to be distributed to various viewers. Television servers 112 may also include interactive TV/video-on-demand (VoD) server(s) and/or network-based digital video recorder (DVR) servers.

In one example, the access network 120 may comprise a Digital Subscriber Line (DSL) network, a broadband cable access network, a Local Area Network (LAN), a cellular or wireless access network, a $3^{rd}$ party network, and the like. For example, the operator of core network 110 may provide a cable television service, an IPTV service, or any other types of television service to subscribers via access network 120. In this regard, access network 120 may include a node 122, e.g., a mini-fiber node (MFN), a video-ready access device (VRAD) or the like. However, in another example, node 122 may be omitted, e.g., for fiber-to-the-premises (FTTP) installations. Access network 120 may also transmit and receive communications between home network 160 and core network 110 relating to voice telephone calls, communications with web servers via other networks 140, content distribution network (CDN) 170 and/or the Internet in general, and so forth. In another example, access network 120 may be operated by a different entity from core network 110, e.g., an Internet service provider (ISP) network.

Alternatively, or in addition, the network 100 may provide television services to home network 160 via satellite broadcast. For instance, ground station 130 may receive television content from television servers 112 for uplink transmission to satellite 135. Accordingly, satellite 135 may receive television content from ground station 130 and may broadcast the television content to satellite receiver 139, e.g., a satellite link terrestrial antenna (including satellite dishes and antennas for downlink communications, or for both downlink and uplink communications), as well as to satellite receivers of other subscribers within a coverage area of satellite 135. In one example, satellite 135 may be controlled and/or operated by a same network service provider as the core network 110. In another example, satellite 135 may be controlled and/or operated by a different entity and may carry television broadcast signals on behalf of the core network 110.

As illustrated in FIG. 1, core network 110 may include various application servers 114. For instance, application servers 114 may be implemented to provide certain functions or features, e.g., a Serving-Call Session Control Function (S-CSCF), a Proxy-Call Session Control Function (P-CSCF), or an Interrogating-Call Session Control Function (I-CSCF), one or more billing servers for billing one or more services, including cellular data and telephony services, wire-line phone services, Internet access services, and television services. Application servers 114 may also include a Home Subscriber Server/Home Location Register (HSS/HLR) for tracking cellular subscriber device location and other functions. An HSS refers to a network element residing in the control plane of an IMS network that acts as a central repository of all customer specific authorizations, service profiles, preferences, etc. Application servers 114 may also include an IMS media server (MS) for handling and terminating media streams to provide services such as announcements, bridges, and Interactive Voice Response (IVR) messages for VoIP and cellular service applications. The MS may also interact with customers for media session management. In addition, application servers 114 may also include a presence server, e.g., for detecting a presence of a user. For example, the presence server may determine the physical location of a user or whether the user is "present" for the purpose of a subscribed service, e.g., online within a physical location for a chatting service, online within a physical location for a betting or wagering service and the like.

In one example, one or more of application servers 114 may comprise network-based components for a sportsbook wagering application (broadly, a sportsbook wagering "application server"). In this regard, one or more of application servers 114 may comprise all or a portion of a computing device or processing system, such as computing system 500, and/or hardware processor element 502 as described in connection with FIG. 5 below, specifically configured to perform various steps, functions, and/or operations in connection with examples of the present disclosure for obtaining and presenting a user wager in addition to an integrated media stream comprising media feeds of a selection of sporting events that are available for wagering via a sportsbook application (e.g., a sportsbook wagering application), as described herein.

Figure 5:
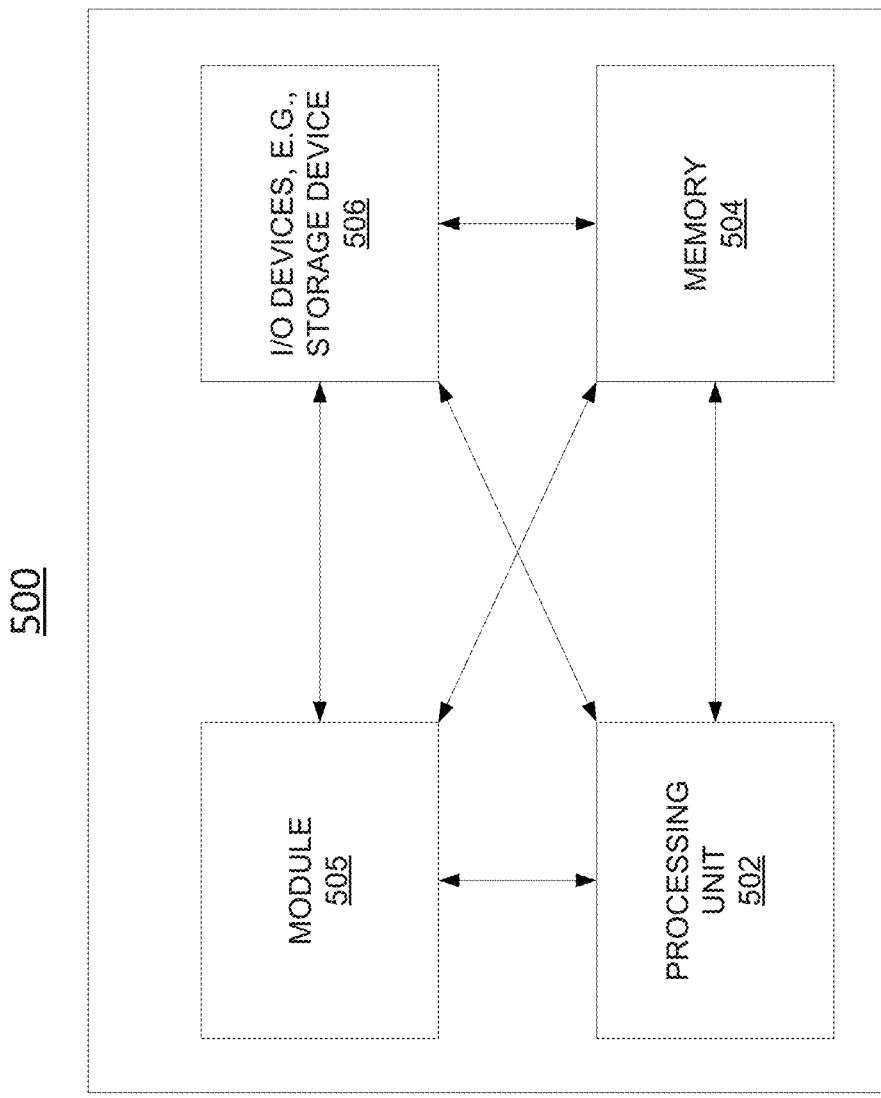
FIG. 5 illustrates a high level block diagram of a computing device or system specifically programmed to perform the steps, functions, blocks and/or operations described herein.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device, or computing system, including one or more processors, or cores (e.g., as illustrated in FIG. 5 and discussed below) or multiple computing devices collectively configured to perform various steps, functions, and/or operations in accordance with the present disclosure. It should be noted that the foregoing are only several examples of the types of relevant application servers 114 that may be included in core network 110 for storing information relevant to providing various services to subscribers.

In accordance with the present disclosure, other networks 140 and servers 149 may comprise networks and devices of various content providers of sporting event media feeds. For instance, servers 149 may represent sources of sporting event media feeds that are operated by or associated with participating teams or players, event organizers, host facilities (e.g., stadiums, arenas, etc.), broadcasters (e.g., televisions stations or channels having the broadcast rights to the sporting events, which in some cases may also comprise a telecommunication network service provider, such as an operator of core network 110), and so forth.

In one example, other networks 140 and servers 149 may alternatively or additionally represent networks and devices of one or several sportsbook operators. In other words, the servers 149 may represent computing systems, or processing systems of the one or more sportsbook operators (broadly, "sportsbook systems"). For instance, as noted above, in one example, a sportsbook wagering application operated by a television service provider (e.g., via one or more of application servers 114) may interface with one or more separate sportsbook systems (e.g., one or more of servers 149) to obtain offers for available wagers for various sporting events, the odds and stakes, and so forth.

The sportsbook system(s) may each comprise a computing platform that includes various computing and storage devices that may store, process, and provide data regarding various sporting events, the odds, stakes, etc., and that may store, process, and provide customer/user account information, e.g., user identities, ages and physical location addresses (which may be required to verify compliance with all federal, state, and/or local laws regarding sports wagering), account balances, authorized users, wagers placed, wagers won, wagers lost, etc. The sportsbook system(s) may interact with various other computing systems, such as various banking systems of various customers' banks, computing systems of sporting event hosts, organizers, etc. (for in-game/in-event updates, outcomes for prop bet, for final results, etc.), and so forth.

In one example, home network 160 may include a home gateway 161, which receives data/communications associated with different types of media, e.g., television, phone, and Internet, and separates these communications for the appropriate devices. The data/communications may be received via access network 120 and/or via satellite receiver 139, for instance. In one example, television data is forwarded to set-top boxes (STBs)/digital video recorders (DVRs) 162A and 162B to be decoded, recorded, and/or forwarded to television (TV) 163A and TV 163B for presentation. Similarly, telephone data is sent to and received from home phone 164; Internet communications are sent to and received from router 165, which may be capable of both wired and/or wireless communication. In turn, router 165 receives data from and sends data to the appropriate devices, e.g., personal computer (PC) 166, mobile devices 167A, and 167B, and so forth. In one example, router 165 may further communicate with TV (broadly a display) 163A and/or 163B, e.g., where one or both of the televisions is a smart TV. In one example, router 165 may comprise a wired Ethernet router and/or an Institute for Electrical and Electronics Engineers (IEEE) 802.11 (Wi-Fi) router, and may communicate with respective devices in home network 160 via wired and/or wireless connections.

In one example, one or both of the STB/DVR 162A and STB/DVR 162B may comprise a streaming video player capable of streaming and playing videos in formats such as H.264 (Advanced Video Coding (AVC)), H.265 (High Efficiency Video Coding (HEVC)), Moving Picture Expert Group (MPEG) .mpeg files, .mov files, .mp4 files, 0.3gp files, .f4f files, .m3u8 files, or the like. Although STB/DVR 162A and STB/DVR 162B are illustrated and described as integrated devices with both STB and DVR functions, in other, further, and different examples, STB/DVR 162A and/or STB/DVR 162B may comprise separate STB and DVR devices. It should be noted that in one example, one or more of mobile devices 157A, 157B, 167A, and 167B, TV 163A, TV 163B, and/or PC 166 may also comprise a streaming video player. In this regard, one or more of mobile devices 157A, 157B, 167A, and 167B, TV 163A, TV 163B, and/or PC 166 may also comprise a client component for a sportsbook wagering application (broadly a sportsbook wagering "client application"), in accordance with the present disclosure.

Network 100 may also include a content distribution network (CDN) 170. In one example, CDN 170 may be operated by a different entity from the core network 110. In another example, CDN 170 may be operated by the same entity as the core network 110, e.g., a telecommunication service provider. In one example, the CDN 170 may comprise a collection of cache servers distributed across a large geographical area and organized in a tier structure. The first tier may comprise a group of servers that accesses content web servers (e.g., origin servers) to pull content into the CDN 170, referred to as an ingestion servers, e.g., ingest server 172. The content may include videos, content of various webpages, electronic documents, video games, etc. A last tier may comprise cache servers which deliver content to end users, referred to as edge caches, or edge servers, e.g., edge server 174. For ease of illustration, a single ingest server 172 and a single edge server 174 are shown in FIG. 1. In between the ingest server 172 and edge server 174, there may be several layers of servers (omitted from the illustrations), referred to as the middle tier. In one example, the edge server 174 may be multi-tenant, serving multiple content providers, such as core network 110, content providers associated with server(s) 149 in other network(s) 140, and so forth. In one example, edge server 174 may comprise a streaming video server. In addition, in one example, ingest server 172 and/or edge server 174 may comprise all or a portion of a computing device or processing system, such as computing system 500, and/or hardware processor element 502 as described in connection with FIG. 5 below, specifically configured to perform various steps, functions, and/or operations in connection with examples of the present disclosure for obtaining and presenting a user wager in addition to an integrated media stream comprising media feeds of a selection of sporting events that are available for wagering via a sportsbook application (e.g., a sportsbook wagering application), as described herein.

In one example, CDN 170, e.g., edge server 174, ingest server 172, and/or other components of CDN 170 (not shown, such as intermediate/mid-tier nodes, etc.), may be configured by one or more of application servers 114, e.g., a processing system of a sportsbook wagering application, to obtain sporting event media feeds (e.g., streaming videos) from servers 149, e.g., sources of sporting event media feeds. In one example, TV servers 112 may obtain sporting event media feeds from servers 149. In turn, TV servers 112 may broadcast the sporting event media feeds as live broadcast television programming via various television channels that are provided by the core network 110 to television service subscribers. In addition, TV servers 112 may forward the sporting event media feeds to CDN 170 for distribution, merging of media streams for sporting events, etc., in accordance with the present disclosure. For instance, in either of the foregoing scenarios, the one or more of application servers 114 may configure one or more components of CDN 170 to package media feeds for a selection of sporting events for a particular user into an integrated media stream, e.g., a unicast media stream, as described herein. For instance, although only a single ingest server 172 is illustrated in the example of FIG. 1, it should be understood that CDN 170 may include numerous ingest servers which may comprise initial points of entry for various media feeds of a plurality of sporting events into the CDN 170. As such, different media feeds may be combined and packaged for an individual user at various points/nodes within CDN 170 depending upon the ingest servers that onboard the various media streams, the edge server that is the last hop within the CDN 170 that serves the particular user, and the topology of any intermediate nodes, the connections between the intermediate nodes and the ingest servers, edge servers, and so forth. In one example, the logic for combining media streams into a unicast stream for an individual user may reside within the CDN 170. Thus, for example, the one or more of application servers 114 may transmit instructions to a CDN controller (not shown) which may distribute instructions to the components of CDN 170 to obtain copies of media streams and to package the media streams into a unicast stream for a particular user. However, in another example, the one or more of application servers 114 may alternatively or additionally transmit instructions to components of CDN 170 to choose the point(s)/node(s) at which media streams for sporting events may be merged/packaged into a unicast stream for a particular user.

In addition, the one or more of application servers 114 may instruct client devices (e.g., via sportsbook wagering "client applications" installed thereon), such as any one or more of mobile devices 157A, 157B, 167A, and 167B, TV 163A, TV 163B, and/or PC 166, to obtain respective unicast media streams of selected sporting events via the CDN 170. In this regard, it should be noted that unicast streams that package selected sporting event media streams for respective users may traverse various additional components of the network 100 between a last hop/egress point of the CDN 170 (e.g., edge server 174) and the user's endpoint/client device. For instance, a unicast stream for endpoint device 157A may traverse from edge server 174 to network element (NE) 111A, to NE 11B (possible traversing intermediate nodes, such as layer 3 routers, etc. within core network 110), to base station/element 152. Similarly, a unicast stream for STB/DVR 162A and/or TV 163A may traverse from edge server 174 to node 122 and home gateway 161. Further aspects of a sportsbook wagering client application, the interactions between client devices/sportsbook wagering client applications and a sportsbook wagering "application server," such as one or more of application servers 114, and a content distribution network, such as CDN 170, are discussed in greater detail below in connection with the examples of FIGS. 2-4.

In addition, it should be noted that the network 100 may be implemented in a different form than that which is illustrated in FIG. 1, or may be expanded by including additional endpoint devices, access networks, network elements, application servers, etc. without altering the scope of the present disclosure. For example, core network 110 is not limited to an IMS network. Wireless access network 150 is not limited to a UMTS/UTRAN configuration. Similarly, the present disclosure is not limited to an IP/MPLS network for VoIP telephony services, or any particular type of broadcast television network for providing television services, and so forth.

As just one example, it should be noted that although application servers 114 appear to be located in core network 110 and separate from the components of CDN 170, in one example, one or more of application servers 114 may be co-located with one or more components of CDN 170, such as edge server 174. For instance, various aspects of core network 110 and CDN 170 may comprise network function virtualization infrastructure (NFVI), e.g., servers in a data center or data centers that are available as host devices to host virtual machines (VMs) and/or containers comprising virtual network functions (VNFs). In other words, at least a portion of the network 100 may incorporate software-defined network (SDN) components. Alternatively, or in addition, any one or more components of the network 100 may be deployed on public cloud infrastructure, e.g., servers in a data center or data centers that are available as host devices to host virtual machines (VMs) and/or containers comprising various virtual network functions (VNFs) or other applications, such as a CDN edge server, a sportsbook wagering "application server," and so forth. As such, the network 100 may be expanded (or contracted) to include more or less components than the state of network 100 that is illustrated in FIG. 1. In this regard, the network 100 may also include a network controller, e.g., a self-optimizing network (SON) and/or a software defined network (SDN) controller. For example, in a SDN architecture, a SDN controller may instantiate VNFs on shared hardware, e.g., NFVI/host devices/SDN nodes, which may be physically located in various places.

Figure 2:
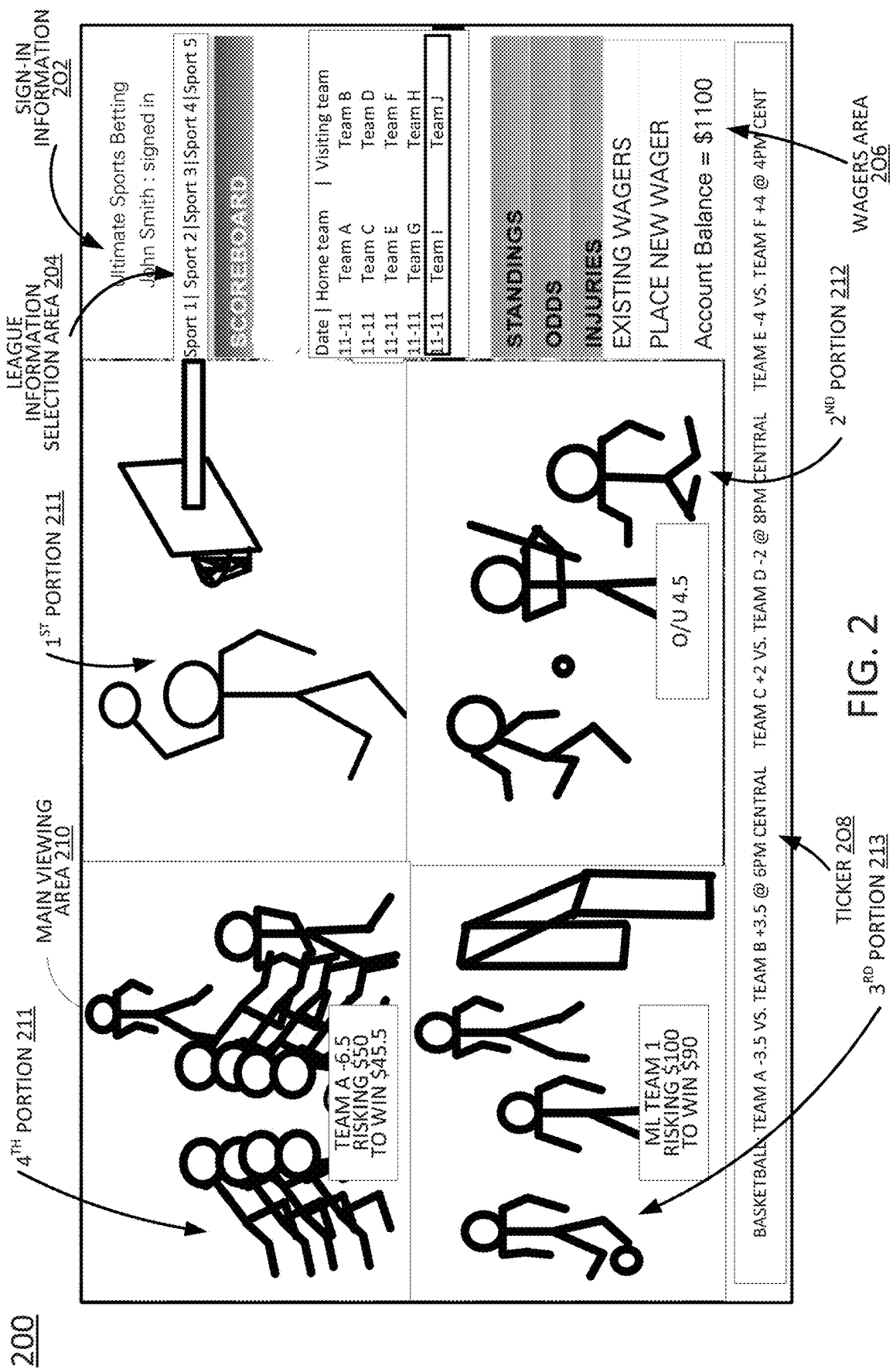
FIG. 2 illustrates a first example interface screen of the present disclosure.

To aid in understanding the present disclosure, FIG. 2 illustrate a first example interface screen 200 of a sportsbook wagering application of the present disclosure. For instance, the first example interface screen 200 may be rendered by a sportsbook wagering application client operating on a client device, and/or by a sportsbook wagering application client operating on a client device in coordination with a sportsbook wagering application server. In one example, a user of the client device/sportsbook wagering application may be a subscriber of a video service provider (e.g., a telecommunication network operator and/or a multichannel video programming distributor (MVPD), broadly, a video service provider). As shown in FIG. 2, the first example interface screen 200 of the sportsbook wagering application may include a main viewing area 210 where media feeds (e.g., video feeds) of multiple sporting events may be presented. For instance, in the present example, four separate sporting event media feeds are simultaneously presented in the respective $1^{st}$-$4^{th}$ portions (211-214) of the main viewing area 210. In one example, one or more of the four media feeds are selected for presentation based upon a current wager, or wagers, of the user. For instance, the user may have placed wagers associated with all four of the sporting events depicted in the respective media feeds presented in the $1^{st}$-$4^{th}$ portions (211-214) of the main viewing area 210.

In one example, one or more of the media feeds presented in the $1^{st}$-$4^{th}$ portions (211-214) of the main viewing area 210 may be manually selected by the user, despite the user not having placed a wager on such sporting event(s). For instance, the user may have permission to access such sporting event(s) in accordance with the user's video service subscription with the video service provider. However, it should be noted that in accordance with the present disclosure, a user may obtain a media feed of a sporting event that is not included in the user's subscription if and when the user places a wager on the sporting event or involving the sporting event, or if and when the user places a wager on the sporting event or involving the sporting event that is over a certain value (e.g., at least $25, at least $50, etc.).

In one example, the present disclosure may select from among multiple sporting event media feeds to include in one of the portions 211-214 of the main viewing area 210 based upon additional criteria. For instance, a user may have placed wagers on or involving more than four sporting events that are taking place at the same time. As such, the present disclosure may select a portion of these sporting events (i.e., less than all of the sporting events on which the user has wagered). For example, in one example, media feeds of the sporting events associated with the most recently placed wagers may be prioritized for selection. In another example, media feeds of the sporting events associated with the earliest placed wagers may be prioritized for selection. In still another example, media feeds of the sporting events that are a "best match" to a user profile may be prioritized for selection. For example, an event involving a user's self-stated favorite team or player may be prioritized, an event involving a user's "hometown" team may be prioritized, an event involving a team or player that a user often or typically wagers on may be prioritized, and so forth. In one example, a default ordering of selection criteria may be applied to determine which sporting event media feeds will be included. In one example, a user may manually select one or more criteria to be applied in order for the present disclosure to then automatically select which sporting event media feeds to present. However, in any case, a user may be provided an option at any time to manually select a particular sporting event media feed to be included in one of the portions of the main viewing area 210.

The first example interface screen 200 also includes a wager area 206 where summary information associated with a user's wagering is presented and where a user may access one or more additional interface screens for placing new wagers or viewing existing wagers. For instance, in one example, wager area 206 may include an account balance (e.g., with one or more sportsbooks associated with the sportsbook wagering application, such as a sportsbook that is included in the sportsbook wagering application, or one or more external sportsbooks that are integrated with the sportsbook wagering application), and "existing wagers," and "place new wager" buttons.

As further illustrated in FIG. 2, in one example, at least part of the first example interface screen 200 may be reserved for displaying sign-in information 202 (e.g., the user's name and the signed in status (e.g., "signed in" or "not signed in"). In one example, at least part of the first example interface screen 200 may be reserved for a league information selection area 204 via which a user may select a given league, and additional information associated with such league, e.g., including "standings," "odds," "injuries," and "scoreboard." In addition, in one example, at least part of the first example interface screen 200 may be reserved for a ticker 208, e.g., with scrolling information regarding upcoming events, such as the next available sporting events to wager on, the next available sporting events within one or more leagues or other categories that the user has indicated is/are of interest (e.g., either via direct input by a user into a user profile and/or via learning over time in accordance with the user's wagering history, etc.).

As further illustrated in FIG. 2, the first example interface screen 200 may include overlays of wagering information on top of the sporting media feeds presented in the respective portions 211-214. For instance, the first portions 211 includes an overlay that indicates the "spread" (−3.5) and the favored team (Team B). Similarly, the second portion 212 includes an overlay that indicates an over/under (O/U) of 4.5. In each of these examples, the wagering information may comprise wager offers from a sportsbook and/or the sportsbook wagering application (or previous wager offers that have closed, wherein the spread and/or the over/under may nevertheless be presented to the user for informational purposes). Notably, the third portion 213 includes an overlay that indicates the moneyline favored team (Team 1) (for example, moneyline wagering is common for soccer events due to the low scoring nature of typical matches), and also includes the information "wagering $100" and "to win $90." In particular, this overlay may present existing wager information of a wager that the user has already placed on this event. Likewise, the fourth portion 214 may include an overlay that indicates the spread (−6.5) and the favored team (Team A), and additionally includes information of an existing user wager that involves "risking $50" for the chance "to win $45.5."

Figure 3:
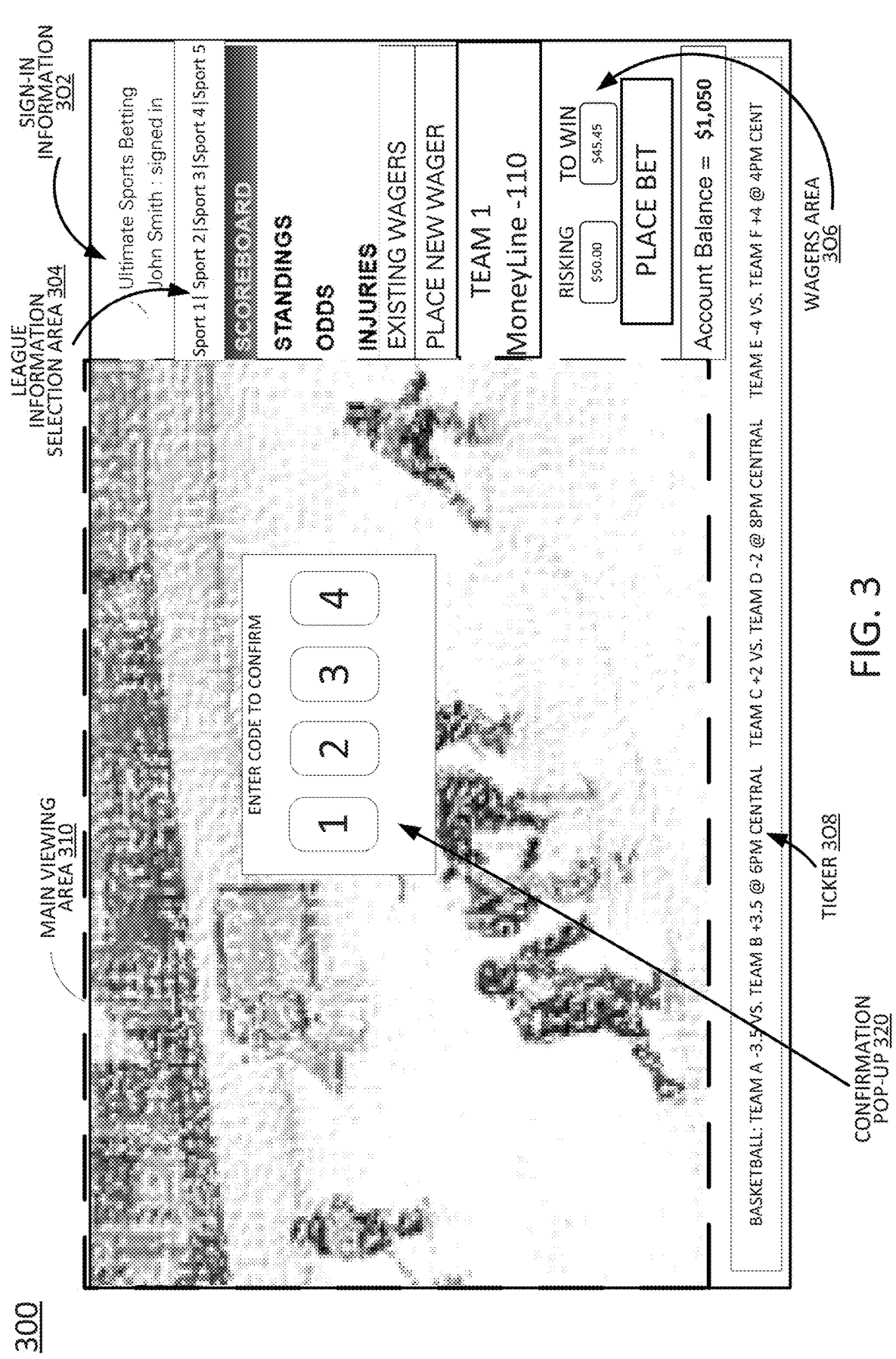
FIG. 3 illustrates a second example interface screen of the present disclosure.

FIG. 3 illustrates a second example interface screen 300 of a sportsbook wagering application of the present disclosure. For instance, the second example interface screen 300 may be rendered by a sportsbook wagering application client operating on a client device, and/or by a sportsbook wagering application client operating on a client device in coordination with a sportsbook wagering application server. In one example, the second interface screen 300 may be presented in response to a selection of a "place new wager" button, or the like, via the first interface screen 200. It should be noted that a user input to access the second interface screen 300 may take various forms, depending upon the type of client device that is utilized in connection with the sportsbook wagering application the capabilities of the client device, and the user preferences. For instance, a user may select a button that is presented on screen by navigating a pointer or highlight bar with a set-top-box/TV remote control, via a mouse or keyboard of a PC, via a touchscreen of a tablet computing device, mobile smartphone, or the like, and so forth. In one example, a user may alternatively or additionally select an option to "place new wager," which may call up the second interface screen 300, via a voice command entered through a remote control (e.g., equipped with voice input capability), via a PC or laptop computer, a tablet computing device, mobile smartphone, or the like, and so forth. In one example, the voice command may comprise one or more keywords, or phrases. In another example, the voice command may be a natural language voice command that is interpreted via digital voice assistant that determine that the intent of the user is to "place new bet."

As illustrated in FIG. 3, the example second interface screen 300 includes a main viewing area 310. The main viewing area 310 may be the same or similar to the main viewing area 210 of the first example interface screen 200 of FIG. 2. However, in one example, as illustrated in FIG. 3, the main viewing area 310 of the second example interface screen 300 may present a single image or video, such as an image from a past matchup of the same two teams that the user is about to wager on, a video from one or more past matchups, or a media feed (e.g., video feed) of a live event the user is about to wager on (e.g., for in-game bets). It should be noted that in other examples, the main viewing area 310 may continue to present multiple sporting event media feeds (e.g., in respective portions of the main viewing area 310) in continuity from the first example interface screen 200.

Similar to the first example interface screen 200, the second example interface screen 300 may include a sign-in information area 302, a league information selection area 304, and a ticker 308. In one example, these aspects of the second example interface screen 300 may remain unchanged from the first example interface screen 200 (e.g., other than for the ticker 208-ticker 308 to continue with the scrolling information, or other information updates, such as a changing moneyline, with a timing of the change coinciding with a transition from the first example interface screen 200 to the second example interface screen 300).

As illustrated in FIG. 3, the second example interface screen 300 includes a wagers area 306. In the wagers area 306, information and available options may be expanded under the "place new wager" button (e.g., as compared to the first example interface screen 200). For instance, in addition to the moneyline and the indicator of the event, the wagers area 306 includes the stakes (e.g., "risking" and "to win" boxes). In one example, a user may input a wager amount that appears in the "risking" box. It is again noted that the user input may be entered in any number of forms depending upon the type of client device, the client device capabilities, user preferences, etc. When the "risking" amount is changed, the amount in the "to win" box may be updated accordingly. The wagers area 306 also include a "place bet" button which may be selected by a user to proceed with a desired wager. Similar to the above, the user input to select "place bet" may be entered in any number of forms depending upon the type of client device, the client device capabilities, user preferences, etc.

In response to a user input to "place bet," the second example interface screen 300 may present a confirmation pop-up 320, which may require a user to enter a code to confirm the wager. In one example, the code may comprise a user-selected passcode. For instance, the requirement to enter the passcode may prevent an unauthorized person for wagering on the user's account (such as a child having access to the same client device to view media content). In one example, the code may comprise a passcode that is provided to another device associated with the user, e.g., via a short message service (SMS)/text message, an email, or the like. In other words, the passcode may be provided via a two-factor authentication procedure. Upon entry of the correct code (e.g., via any one of one or more available types of inputs), the wager may be confirmed and the client device may revert the display back to the first example interface screen 200 of FIG. 2. In one example, the first example interface screen 200 may be updated to account for the user's recent wager. For instance, one of the sporting event media feeds may be changed to include the media feed associated with the sporting event upon which the user has just wagered. In another example, there may be some delay between the user's wager and the start of the associated sporting event. As such, the previous selection of sporting event media feeds to display in the respective portions 211-214 may be retained until such time as the sporting event associated with the new wager begins.

It should be noted that the examples of FIGS. 2 and 3 are just two examples of interface screens that may be provided in accordance with the present disclosure. Thus, in other, further, and different examples, more or less features may be included in the respective first and second example interface screens 200 and 300. As just one example, the ticker 208 and/or the ticker 308 may be omitted. In another example, popular, featured, and/or sponsored wagers may be presented in the wagers area 206 or elsewhere on screen (e.g., statistics of wagers (e.g., which games are being betted on, how much is the average bet, what regions are the bets originating from, etc.) made by other viewers). In still another example, a different number of sporting event media feeds may be simultaneously presented, e.g., two, three, six, etc. Thus, these and other modifications are all contemplated within the scope of the present disclosure.

Figure 4:
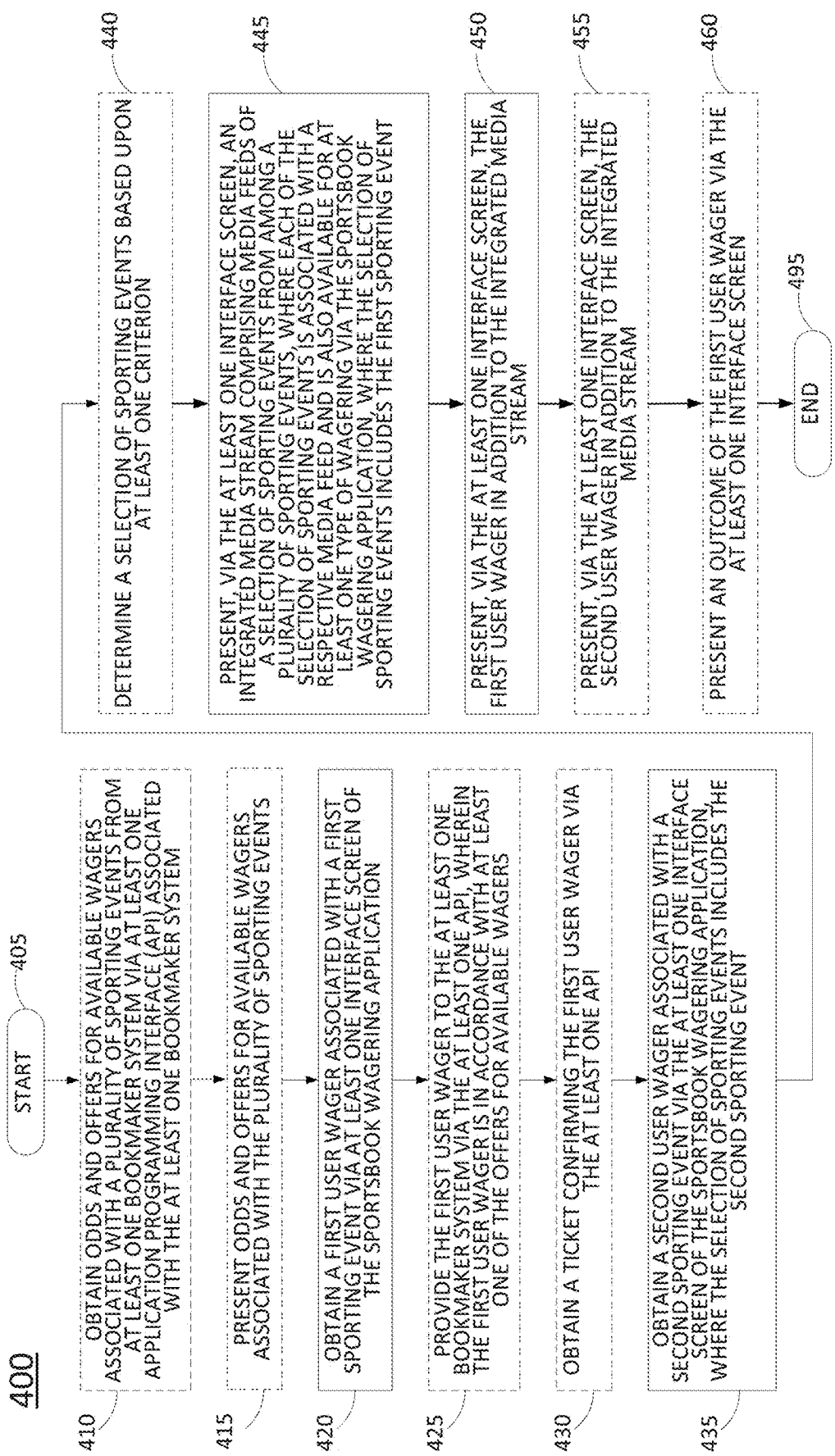
FIG. 4 illustrates a flowchart of an example method for obtaining and presenting a user wager in addition to an integrated media stream comprising media feeds of a selection of sporting events that are available for wagering via a sportsbook application.

FIG. 4 illustrates a flowchart of a method 400 for obtaining and presenting a user wager in addition to an integrated media stream comprising media feeds of a selection of sporting events that are available for wagering via a sportsbook application, in accordance with the present disclosure. In one example, the method 400 is performed by a device or processing system that provides caching of videos (or portions thereof) for video streaming. For instance, the method 400 may be performed by one or more devices as illustrated in FIG. 1, such as one or more of application servers 114, or any one or more components thereof, or by one or more of these devices in conjunction with one another and/or in conjunction with other devices and/or components of network 100 of FIG. 1, e.g., edge server 174, ingest server 172, one of TV servers 112, or the like, servers 149 (e.g., sporting event media feed sources and/or external sportsbook systems), one or more client devices, such as one of STB/DVR 162A, STB/DVR 162B, TV 163A, TV 163B, one or more of mobile devices 157A, 157B, 167A, and 167B, and/or PC 166, and so forth. In one example, the steps, functions, or operations of method 400 may be performed by a computing device or processing system, such as computing system 500 and/or hardware processor element 502 as described in connection with FIG. 5 below. For instance, the computing system 500 may represent any one or more components of the network 100 that is/are configured to perform the steps, functions and/or operations of the method 400. Similarly, in one example, the steps, functions, or operations of the method 400 may be performed by a processing system comprising one or more computing devices collectively configured to perform various steps, functions, and/or operations of the method 400. For instance, multiple instances of the computing system 500 may collectively function as a processing system. For illustrative purposes, the method 400 is described in greater detail below in connection with an example performed by a processing system. The method 400 begins in step 405 and may proceed to optional step 410, optional step 415, or step 420.

At optional step 410, the processing system may obtain odds and offers for available wagers associated with a plurality of sporting events from at least one bookmaker system via at least one application programming interface (API) associated with the at least one bookmaker system. In one example, the processing system may provide and/or utilize different APIs for various bookmaker systems (or may use the same API that is standardized by sportsbook wagering application for bookmakers to integrate with).

At optional step 415, the processing system may present odds and offers for available wagers associated with the plurality of sporting events via at least one interface screen of the sportsbook wagering application. In one example, the odds and offers may be those obtained at optional step 410 and may include the stakes that are set by one or more bookmakers. As such, optional step 415 may include presenting odds and wager offers from multiple bookmaker systems via the at least one interface screen. In one example, optional step 415 may include presenting a recommendation of a particular bookmaker systems from among the multiple bookmaker systems for similar wager offers for a same event, e.g., lower commission/vigorish, etc. better odds or stakes for a particular outcome, etc. In another example, the odds and offers may be obtained from personnel or internal systems of an operator of the sportsbook wagering application (e.g., machine learning/artificial intelligence-based oddsmakers, risk calculators, etc.).

At step 420, the processing system obtains a first user wager associated with a first sporting event via at least one interface screen of the sportsbook wagering application. For instance, the first user wager may be in accordance with at least one of the offers for available wagers that may be presented at optional step 415. Alternatively, or in addition, step 420 may include presenting a first interface screen of the sportsbook wagering application that includes a schedule of the plurality of sporting events, and obtaining a user selection of the first sporting event from the schedule of sporting events, e.g., via navigating a pointer or highlight bar via a remote control, keyboard, mouse, touchscreen, etc., via voice command, and so forth. In addition, in one example, step 420 may include presenting one or more odds and one or more offers for an available wager, or wagers, associated with the first sporting event.

In one example, the sporting events included in the schedule of sporting events may be selected from among a plurality of available sporting events (e.g., all sporting events available for wagering via the sportsbook wagering application). In one example, the selection of sporting events (i.e., those that are presented and visible on screen) may be in accordance with a user preference. In one example, a user may choose an option to relist the plurality of sporting events based upon one of several criteria which may be selected via a dropdown menu, via voice command, etc., such as sporting events starting soonest and/or bets closing soonest, sporting events that are most popular in terms of number of bets, amount wagered, and/or number of users currently tuned to watch (either across sportsbook wagering application or across all viewers for which the apparatus has insight), and so on. In one example, the schedule of sporting events may be listed based upon sport or league (e.g., those preferred by the user) and/or based upon geography (e.g., sporting events that are closest to the user, sporting events that are US only, etc.).

In one example, step 420 may further include presenting a second interface screen of the sportsbook wagering application in response to the obtaining of the user selection of the first sporting event from the schedule of sporting events. For instance, the second interface screen may present information regarding the first sporting event, such as the start time, the location, the participants, teams, etc., and wagering information regarding the first sporting event. In one example, the first interface screen may include some wagering information. However, the second interface screen may be more detailed. In addition, in one example, step 420 may include obtaining the first user wager associated with the first sporting event via the second interface screen. It should also be noted that in such an example, the "at least one interface screen" may include both the first interface screen and the second interface screen.

In one example, step 420 may further include presenting a third interface screen of the sportsbook wagering application to confirm the first user wager, and obtaining a confirmation of the first user wager in accordance with the third interface screen. In one example, the third interface screen may comprise a pop-up window, such as illustrated in the example of FIG. 3. In one example, the confirmation may comprise a verification, e.g., "yes" or "no," or may include requiring the user to reenter an account passcode. In one example, step 420 may further include transmitting a notification to at least a second device associated with the user that is different from a device that is used to place the first user wager, and may also include obtaining a confirmation from the at least the second device. In some cases, the processing system may just send the notification, e.g., if less than $50, but if over, may require confirmation from the at least the second user device, e.g., by requesting and obtaining a reply text "1," or the like, or by requesting and obtaining a clicking of link in an email to confirm the first user wager. In still another example, the processing system may send a notification to a second device, where the notification includes a passcode, and may require the user to enter the passcode via the third interface screen in order to confirm the first user wager.

At optional step 425, the processing system may provide the first user wager to the at least one bookmaker system via the at least one API, e.g., in an example where the bookmaker(s) is/are separate entities from an operator of the processing system and the sportsbook wagering application provided thereby.

At optional step 430, the processing system may obtain a ticket confirming the first user wager via the at least one API. For instance, in accordance with users' permissions, the sportsbook wagering application may maintain records of users' account balances, users' wagers and the outcomes, and so forth. In the case of any discrepancies or perceived errors, the processing system records may be used to verify any corresponding records of the user, of the bookmaker system(s), etc.

At optional step 435, the processing system may obtain a second user wager associated with a second sporting event via the at least one interface screen of the sportsbook wagering application. For instance, optional step 435 may comprise the same or similar operations as described above in connection with step 420. In one example, optional step 435 may be preceded by and/or include operations that are the same or similar to that which is described in connection with optional steps 410 and 415.

At optional step 440, the processing system may determine a selection of sporting events for presentation of associated media feeds via an integrated media stream based upon one or more criteria which may include: a user choice, popularities of the sporting events of the selection of sporting events among a plurality of users of the sportsbook wagering application, or recencies of user wagers relating to the sporting events made by the user (e.g., including at least the first wager). For instance, popularities may be scores that are based upon past viewership of the same type of event, events with the same team or teams, same players, etc., or may be scores in terms of the total number of wagers, the total monetary value of wagers, etc. The one or more criteria may also include a matching of the sporting events to a user profile. For instance, different sporting events can be matched to a same or different sets of one or more aspects of a user profile, or may be selected in accordance with scores that define a degree of correlation/matching of sporting events to the user profile. For example, the matching of sporting events to a user profile can be based upon particular teams or players, particular matchups or rivalries, recently watched sporting events, types of bets, and so forth that are favored by the user.

In one example, at least one of the selection of sporting events is chosen based upon an anticipated time remaining until an outcome of a user wager associated with the at least one of the selection of sporting events is determined. For instance, the processing system may be configured to prioritize and/or to select sporting events that are 90 percent completed, 95 percent completed, etc., and/or those that have five minutes remaining, two minutes remaining, and so forth. In one example, the selection of sporting events includes at least the first sporting event (e.g., selected in accordance with the one or more criteria). In addition, in one example, the selection of sporting events further includes the second sporting event (e.g., selected in accordance with the one or more criteria). In one example, the selection of sporting events may comprise four sporting events (e.g., as illustrated in the example of FIG. 2). In one example, the first user wager may comprise a parlay wager associated with at least two sporting events of the plurality of sporting events. In such an example, optional step 440 may include selecting/choosing the at least two of the selection of sporting events based upon the at least two of the selection of sporting events being a part of the parlay wager.

In one example, for at least one of the selection of sporting events, the determining comprises selecting the at least one of the selection of sporting events based upon at least one of: a closeness of scores or times among competitors of the at least one of the selection of sporting events to each other; (e.g., for moneyline wagers), a closeness of the scores or the times among the competitors of the at least one of the selection of sporting events to an over-under factor associated with the user wager, or a closeness of the scores or the times among the competitors of the at least one of the selection of sporting events to an equalizer associated with the user wager. For example, if the score(s) is/are close to a spread or "equalizer" that would affect outcome of wager, such a sporting event may be more exciting to watch than a sporting event that user has very likely already lost, such as baseball game in the top of the 9th inning with the home team winning 13 to 1, the likelihood of the home team winning is objectively very high). In one example, the likelihoods/predictions for outcomes of sporting events may be obtained from one or more bookmaker and/or oddsmaker systems (e.g., via the at least one API), or may be based upon internal prediction algorithms that comprise part of the sportsbook wagering application and/or that are maintained by the operator of the sportsbook wagering application.

At step 445, the processing system presents, via the at least one interface screen, an integrated media stream comprising media feeds of a selection of sporting events from among a plurality of sporting events, where each of the selection of sporting events is associated with a respective media feed and is also available for at least one type of wagering via the sportsbook wagering application, where the selection of sporting events includes the first sporting event. In one example, step 445 may include displaying respective media feeds of the selection of sporting events in respective portions of a display screen of a user device. For instance, the at least one interface screen may include an interface screen such as the example illustrated in FIG. 2.

As noted above, in one example, the processing system may include a user device, a set-top box, etc. As also noted above, the processing system may alternatively or additionally comprise at least a portion of a content distribution network. For instance, the content distribution network may ingest and distribute media of the plurality of sporting events for a plurality of user devices. In one example, the integrated media stream is a unicast media stream comprising a package of the respective media feeds of the selection of sporting events. In one example, step 445 may include transmitting the integrated media stream to a user device. In one example, step 445 may further include packaging the respective media feeds of the selection of sporting events into the unicast media stream.

At step 450, the processing system presents, via the at least one interface screen, the first user wager in addition to the integrated media stream. For instance, the processing system may comprise a user device that may render the first user interface to include an overlay of the first user wager in a respective portion of a display screen that is presenting the media feed of the sporting event associated with the first user wager (e.g., as illustrated in the example of FIG. 2). Alternatively, or in addition, the first user wager may be presented in a different portion of the at least one interface screen, such as in in an information area that is above, below, or to the side of a portion of the at least one interface screen in which the integrated media stream is presented.

At optional step 455, the processing system may present, via the at least one interface screen, the second user wager in addition to the integrated media stream. For instance, the second user wager may be presented as a second overlay over a respective portion of the at least one interface screen in which the integrated media steam is presented (e.g., over the portion that is for the media feed of the sporting event associated with the second user wager). Alternatively, or in addition, the second user wager may be may be presented in a different portion of the at least one interface screen, e.g., in a same portion of the at least one interface screen in which the first user wager is presented, such as in a list.

At optional step 460, the processing system may present an outcome of the first user wager via the at least one interface screen. In one example, the processing system may present at least one of: an amount of value won or lost as a result of the outcome of the first user wager, or an account balance with at least one bookmaker system resulting from the outcome of the first user wager. For instance, the outcome may be presented in a same overlay as described in connection with step 450 and/or in another location of the at least one interface screen in which the first user wager was presented in connection with step 450. In one example, an outcome of the second user wager (in an example where the second user wager is obtained at optional step 435) may similarly be presented via the at least one interface screen. The presentation of the wager outcome(s) may include redemption of the winnings into the user's account.

Following step 450, or following either or both of optional steps 455 or 460, the method 400 proceeds to step 495. At step 495, the method 400 ends.

It should be noted that the method 400 may be expanded to include additional steps, or may be modified to replace steps with different steps, to combine steps, to omit steps, to perform steps in a different order, and so forth. For instance, in one example the processing system may repeat one or more steps of the method 400, such as for obtaining a third user wager, a fourth user wager, etc., for selecting and presenting a different selection of sporting events due to a progression of time, additional user wagers, and/or other changes in circumstance, and so forth. In one example, the method 400 may be expanded to include authenticating the user to the sportsbook wagering application and to the at least one bookmaker system via a single sign-on. Alternatively, or in addition, the method 400 may further include a multi-factor authentication process. For instance, the processing system may send a code in connection with a sign-on attempt, or for an attempt to place a wager. The code may comprise a passcode that is provided to another device associated with the user, e.g., via a short message service (SMS)/text message, an email, or the like. Upon entry of the correct code, the user be signed-in or the wager may be confirmed.

In addition, although not expressly specified above, one or more steps of the method 400 may include a storing, displaying and/or outputting step as required for a particular application. In other words, any data, records, fields, and/or intermediate results discussed in the respective method(s) can be stored, displayed and/or outputted to another device as required for a particular application. Furthermore, operations, steps, or blocks in FIG. 4 that recite a determining operation or involve a decision do not necessarily require that both branches of the determining operation be practiced. In other words, one of the branches of the determining operation can be deemed as an optional step. In addition, one or more steps, blocks, functions, or operations of the above described method 400 may comprise optional steps, or can be combined, separated, and/or performed in a different order from that described above, without departing from the example embodiments of the present disclosure. Thus, these and other modifications are all contemplated within the scope of the present disclosure.

It should be noted that given different wagering or gambling requirements and/or constraints set by different state and/or local authorities, deployment of the present embodiments must comply with the pertinent state and/or local laws and regulations. For example, in one embodiment the current physical location of the user must be ascertained and/or confirmed by the user (e.g., GPS location information from the user device used to place the wager, physical location of the network access point from which the user device is accessing the wagering service, and so on) before a wager is permitted to be placed. Additionally, in another example the age of the user must also be ascertained, e.g., from the user wagering account information, driver license, credit card information, and so on. Such verifications may ensure that the requirements and/or constraints set by the different state and/or local authorities are being met.

FIG. 5 depicts a high-level block diagram of a computing system 500 (e.g., a computing device or processing system) specifically programmed to perform the functions described herein. For example, any one or more components or devices illustrated in FIG. 1 or described in connection with the method 400 of FIG. 4, may be implemented as the computing system 500. As depicted in FIG. 5, the computing system 500 comprises a hardware processor element 502 (e.g., comprising one or more hardware processors, which may include one or more microprocessor(s), one or more central processing units (CPUs), and/or the like, where the hardware processor element 502 may also represent one example of a "processing system" as referred to herein), a memory 504, (e.g., random access memory (RAM), read only memory (ROM), a disk drive, an optical drive, a magnetic drive, and/or a Universal Serial Bus (USB) drive), a module 505 for obtaining and presenting a user wager in addition to an integrated media stream comprising media feeds of a selection of sporting events that are available for wagering via a sportsbook application, and various input/output devices 506, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one hardware processor element 502 is shown, the computing system 500 may employ a plurality of hardware processor elements. Furthermore, although only one computing device is shown in FIG. 5, if the method(s) as discussed above is implemented in a distributed or parallel manner for a particular illustrative example, e.g., the steps of the above method(s) or the entire method(s) are implemented across multiple or parallel computing devices, then the computing system 500 of FIG. 5 may represent each of those multiple or parallel computing devices. Furthermore, one or more hardware processor elements (e.g., hardware processor element 502) can be utilized in supporting a virtualized or shared computing environment. The virtualized computing environment may support one or more virtual machines which may be configured to operate as computers, servers, or other computing devices. In such virtualized virtual machines, hardware components such as hardware processors and computer-readable storage devices may be virtualized or logically represented. The hardware processor element 502 can also be configured or programmed to cause other devices to perform one or more operations as discussed above. In other words, the hardware processor element 502 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer-readable instructions pertaining to the method(s) discussed above can be used to configure one or more hardware processor elements to perform the steps, functions and/or operations of the above disclosed method(s). In one example, instructions and data for the present module 505 for obtaining and presenting a user wager in addition to an integrated media stream comprising media feeds of a selection of sporting events that are available for wagering via a sportsbook application (e.g., a software program comprising computer-executable instructions) can be loaded into memory 504 and executed by hardware processor element 502 to implement the steps, functions or operations as discussed above in connection with the example method 400. Furthermore, when a hardware processor element executes instructions to perform operations, this could include the hardware processor element performing the operations directly and/or facilitating, directing, or cooperating with one or more additional hardware devices or components (e.g., a co-processor and the like) to perform the operations.

The processor (e.g., hardware processor element 502) executing the computer-readable instructions relating to the above described method(s) can be perceived as a programmed processor or a specialized processor. As such, the present module 505 for obtaining and presenting a user wager in addition to an integrated media stream comprising media feeds of a selection of sporting events that are available for wagering via a sportsbook application (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium may comprise a physical device, a hardware device, or a device that is discernible by the touch. More specifically, the computer-readable storage device or medium may comprise any physical devices that provide the ability to store information such as instructions and/or data to be accessed by a processor or a computing device such as a computer or an application server.

While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:

1. An apparatus comprising:
a processing system including at least one processor; and
a computer-readable medium storing instructions which, when executed by the processing system, cause the processing system to perform operations, the operations comprising:
obtaining odds and offers for available wagers associated with a plurality of sporting events from a plurality of bookmaker systems via at least one application programming interface associated with each of the plurality of bookmaker systems;
presenting the odds and offers for available wagers associated with the plurality of sporting events;
obtaining a first user wager associated with a first sporting event via at least one interface screen of a sportsbook wagering application, wherein the first user wager is in accordance with a first offer of the offers for available wagers from a first bookmaker system of the plurality of bookmaker systems;
providing the first user wager to the first bookmaker system via the at least one application programming interface associated with the first bookmaker system;
presenting, via the at least one interface screen, an integrated media stream comprising media feeds of a selection of sporting events from among the plurality of sporting events, wherein each of the selection of sporting events is associated with a respective media feed and is also available for at least one type of wagering via the sportsbook wagering application, wherein the selection of sporting events includes the first sporting event; and
presenting, via the at least one interface screen, the first user wager in addition to the integrated media stream.

2. The apparatus of claim 1, the operations further comprising:
obtaining a second user wager associated with a second sporting event via the at least one interface screen of the sportsbook wagering application, wherein the selection of sporting events includes the second sporting event.

3. The apparatus of claim 2, the operations further comprising:
presenting, via the at least one interface screen, the second user wager in addition to the integrated media stream.

4. The apparatus of claim 1, wherein the obtaining the first user wager comprises:

presenting a first interface screen of the at least one interface screen that includes a schedule of the plurality of sporting events; and obtaining a user selection of the first sporting event from the schedule of the plurality of sporting events.

5. The apparatus of claim 4, wherein the obtaining the first user wager further comprises:

presenting a second interface screen of the at least one interface screen, in response to the obtaining of the user selection of the first sporting event from the schedule of the plurality of sporting events, wherein the second interface screen presents information regarding the first sporting event, wherein the information regarding the first sporting event includes wagering information regarding the first sporting event; and obtaining the first user wager associated with the first sporting event via the second interface screen.

6. The apparatus of claim 5, wherein the obtaining the first user wager further comprises:

presenting a third interface screen of the at least one interface screen to confirm the first user wager; and obtaining a confirmation of the first user wager in accordance with the third interface screen.

7. The apparatus of claim 1, wherein the presenting the integrated media stream comprises displaying respective media feeds of the selection of sporting events in respective portions of a display screen of a user device.

8. The apparatus of claim 7, wherein the apparatus comprises the user device.

9. The apparatus of claim 1, wherein the apparatus comprises a set-top box.

10. The apparatus of claim 1, wherein the integrated media stream is a unicast media stream comprising a package of the respective media feeds of the selection of sporting events.

11. The apparatus of claim 10, wherein the presenting the integrated media stream comprises transmitting the integrated media stream to a user device.

12. The apparatus of claim 11, wherein the presenting the integrated media stream further comprises packaging the respective media feeds of the selection of sporting events into the unicast media stream.

13. The apparatus of claim 12, wherein the processing system comprises a content distribution network.

14. The apparatus of claim 1, the operations further comprising:

determining the selection of sporting events based upon at least one of:
 a user choice;
 a matching of a sporting event of the selection of the at least one sporting event to a user profile;
 a popularity of the sporting event of the selection of the at least one sporting event among a plurality of users of the sportsbook wagering application; or
 a recency of user wagers relating to the sporting event of the selection of the at least one sporting event made by a same user, where the user wagers include the first user wager.

15. The apparatus of claim 14, wherein for at least one of the selection of sporting events, the determining comprises:

selecting the at least one of the selection of sporting events based upon an anticipated time remaining until an outcome of a user wager associated with the at least one of the selection of sporting events is determined.

16. The apparatus of claim 14, wherein for at least one of the selection of sporting events, the determining comprises selecting the at least one of the selection of sporting events based upon at least one of:

a closeness of scores or times among competitors of the at least one of the selection of sporting events to each other;

a closeness of the scores or the times among the competitors of the at least one of the selection of sporting events to an equalizer associated with the user wager; or a closeness of the scores or the times among the competitors of the at least one of the selection of sporting events to an over-under factor associated with the user wager.

17. A method comprising:

obtaining, by a processing system including at least one processor, odds and offers for available wagers associated with a plurality of sporting events from a plurality of bookmaker systems via at least one application programming interface associated with each of the plurality of bookmaker systems;

presenting, by the processing system, the odds and offers for available wagers associated with the plurality of sporting events;

obtaining, by the processing system, a first user wager associated with a first sporting event via at least one interface screen of a sportsbook wagering application, wherein the first user wager is in accordance with a first offer of the offers for available wagers from a first bookmaker system of the plurality of bookmaker systems;

providing, by the processing system, the first user wager to the first bookmaker system via the at least one application programming interface associated with the first bookmaker system;

presenting, by the processing system via the at least one interface screen, an integrated media stream comprising media feeds of a selection of sporting events from among the plurality of sporting events, wherein each of the selection of sporting events is associated with a respective media feed and is also available for at least one type of wagering via the sportsbook wagering application, wherein the selection of sporting events includes the first sporting event; and presenting, by the processing system via the at least one interface screen, the first user wager in addition to the integrated media stream.

18. A non-transitory computer-readable medium storing instructions which, when executed by a processing system including at least one processor, cause the processing system to perform operations to provide a sportsbook wagering application, the operations comprising:

obtaining odds and offers for available wagers associated with a plurality of sporting events from a plurality of bookmaker systems via at least one application programming interface associated with each of the plurality of bookmaker systems;

presenting the odds and offers for available wagers associated with the plurality of sporting events;

obtaining a first user wager associated with a first sporting event via at least one interface screen of the sportsbook wagering application, wherein the first user wager is in accordance with a first offer of the offers for available wagers from a first bookmaker system of the plurality of bookmaker systems;

providing the first user wager to the first bookmaker system via the at least one application programming interface associated with the first bookmaker system;

presenting, via the at least one interface screen, an integrated media stream comprising media feeds of a selection of sporting events from among the plurality of sporting events, wherein each of the selection of sporting events is associated with a respective media feed and is also available for at least one type of wagering via the sportsbook wagering application, wherein the selection of sporting events includes the first sporting event; and presenting, via the at least one interface screen, the first user wager in addition to the integrated media stream.

19. The non-transitory computer-readable medium of claim 18, the operations further comprising:

obtaining a second user wager associated with a second sporting event via the at least one interface screen of the sportsbook wagering application, wherein the selection of sporting events includes the second sporting event.

20. The non-transitory computer-readable medium of claim 19, the operations further comprising:

presenting, via the at least one interface screen, the second user wager in addition to the integrated media stream.

* * * * *